United States Patent
Heinen

(10) Patent No.: US 9,533,582 B2
(45) Date of Patent: Jan. 3, 2017

(54) VEHICLE AND POWER UNIT FOR IT

(75) Inventor: Adrianus Johannes Heinen, Apeldoorn (NL)

(73) Assignee: E-TRACTION EUROPE B.V., Apeldoorn (NL)

( * ) Notice: Subject to any disclaimer, the term of this patent is extended or adjusted under 35 U.S.C. 154(b) by 0 days.

(21) Appl. No.: 13/233,564

(22) Filed: Sep. 15, 2011

(65) Prior Publication Data

US 2012/0004800 A1  Jan. 5, 2012

Related U.S. Application Data

(63) Continuation of application No. 12/956,115, filed on Nov. 30, 2010, now abandoned, which is a (Continued)

(30) Foreign Application Priority Data

Aug. 25, 2004  (NL) ..................... 1026910

(51) Int. Cl.
*B60L 8/00* (2006.01)
*B60L 11/00* (2006.01)
(Continued)

(52) U.S. Cl.
CPC .. *B60L 8/00* (2013.01); *B60L 1/02* (2013.01); *B60L 3/0061* (2013.01); *B60L 7/14* (2013.01); *B60L 8/003* (2013.01); *B60L 11/005* (2013.01); *B60L 11/14* (2013.01); *B60L 11/1803* (2013.01); *B60L 11/1861* (2013.01); *B60L 11/1887* (2013.01); *B60L 2210/10* (2013.01); *B60L 2210/40* (2013.01); *B60L 2220/14* (2013.01); *B60L 2240/12* (2013.01); *B60L 2240/425* (2013.01); *B60L 2240/445* (2013.01); *B60L 2240/547* (2013.01); *B60L 2240/549* (2013.01); *B60L 2250/10* (2013.01); *Y02T 10/642* (2013.01); *Y02T 10/70* (2013.01); *Y02T 10/705* (2013.01); *Y02T 10/7022* (2013.01); *Y02T 10/7044* (2013.01); *Y02T 10/7077* (2013.01); *Y02T 10/7083* (2013.01); (Continued)

(58) Field of Classification Search
USPC .............................. 180/65.1–65.29
See application file for complete search history.

(56) References Cited

U.S. PATENT DOCUMENTS 4,883,724 A * 11/1989 Yamamoto .................. 429/431
5,318,142 A *  6/1994 Bates et al. ............. 180/65.245
(Continued)

*Primary Examiner* — Jeffrey J Restifo
*Assistant Examiner* — Erez Gurari
(74) *Attorney, Agent, or Firm* — Young & Thompson

(57) ABSTRACT

A vehicle includes at least one electromotor for driving the vehicle, an actuator for controlling the supply of electric power to the electromotor, and a power system for providing electric power to the electromotor. The power system includes an energy storage, an energy meter for measuring the energy condition of the energy storage, a power generator for generating electric power, and a computer system. The energy storage supplies power to the electromotor. The power generator supplies energy to the energy storage. The computer system controls the power supplied by the power generator so that the energy storage is able to provide the electromotor with the power the electromotor needs for driving the vehicle.

16 Claims, 4 Drawing Sheets

Related U.S. Application Data continuation of application No. 11/574,143, filed as application No. PCT/NL2005/000616 on Aug. 25, 2005, now abandoned.

(51) Int. Cl.
*B60L 1/02* (2006.01)
*B60L 3/00* (2006.01)
*B60L 7/14* (2006.01)
*B60L 11/14* (2006.01)
*B60L 11/18* (2006.01)

(52) U.S. Cl.
CPC ........ *Y02T 10/7216* (2013.01); *Y02T 10/7241* (2013.01); *Y02T 10/7258* (2013.01); *Y02T 90/34* (2013.01)

(56) References Cited

U.S. PATENT DOCUMENTS

| | | | |
|---|---|---|---|
| 5,705,859 A * | 1/1998 | Karg | B60K 6/28 180/65.245 |
| 6,064,937 A * | 5/2000 | Yang | 701/93 |
| 6,304,055 B1 * | 10/2001 | Winstead | 320/104 |
| 7,059,436 B2 * | 6/2006 | Iwasaki | 429/430 |
| 7,122,979 B2 * | 10/2006 | Wilton et al. | 318/400.09 |
| 2001/0009147 A1 * | 7/2001 | Takashima et al. | 123/406.14 |
| 2002/0114986 A1 * | 8/2002 | Aoyagi et al. | 429/23 |
| 2003/0159866 A1 * | 8/2003 | Claypole et al. | 180/65.5 |
| 2003/0169019 A1 * | 9/2003 | Oosaki | H02J 7/0047 320/132 |
| 2005/0045392 A1 * | 3/2005 | Maslov et al. | 180/65.5 |
| 2005/0048335 A1 * | 3/2005 | Fields et al. | 429/22 |
| 2005/0161268 A1 * | 7/2005 | Yang | 180/65.2 |
| 2006/0102397 A1 * | 5/2006 | Buck et al. | 180/65.3 |

* cited by examiner

| | amperage batt | amperage generator | amperage batt 2 | amperage fuelcell | |
|---|---|---|---|---|---|
| 0 | 0 | 70 | 0 | 0 | |
| 1 | 50 | 70 | 50 | 0 | |
| 2 | 200 | 70 | 0 | 200 | |
| 3 | 200 | 70 | 0 | 200 | |
| 4 | 200 | 70 | 0 | 200 | accelerating |
| 5 | 200 | 70 | 0 | 200 | |
| 6 | 180 | 70 | 0 | 180 | |
| 7 | 160 | 70 | 0 | 160 | |
| 8 | 140 | 70 | 0 | 140 | |
| 9 | 120 | 70 | 0 | 120 | |
| 10 | 120 | 70 | 0 | 120 | |
| 11 | 120 | 70 | 0 | 120 | |
| 12 | 120 | 70 | 0 | 120 | |
| 13 | 120 | 70 | 0 | 120 | |
| 14 | 120 | 70 | 0 | 120 | constant speed |
| 15 | 120 | 70 | 0 | 120 | |
| 16 | 120 | 70 | 0 | 120 | |
| 17 | 120 | 70 | 0 | 120 | |
| 18 | 120 | 70 | 0 | 120 | |
| 19 | 120 | 70 | 0 | 120 | |
| 20 | 100 | 70 | 0 | 100 | |
| 21 | 80 | 70 | 0 | 80 | |
| 22 | 60 | 70 | 0 | 60 | braking |
| 23 | 40 | 70 | 0 | 40 | |
| 24 | 20 | 70 | 0 | 20 | |
| 25 | 0 | 70 | 0 | 0 | |
| 26 | -20 | 70 | -20 | 0 | regenerative |
| 27 | -40 | 70 | -40 | 0 | |
| 28 | -40 | 70 | -40 | 0 | |
| 29 | -40 | 70 | -40 | 0 | |
| 30 | 0 | 70 | 0 | 0 | |
| 31 | 0 | 70 | 0 | 0 | standing still |
| 32 | 0 | 70 | 0 | 0 | |
| 33 | 50 | 70 | 0 | 0 | |
| 34 | 200 | 70 | 50 | 0 | |
| 35 | 200 | 70 | 0 | 200 | |
| 36 | 200 | 70 | 0 | 200 | |
| 37 | 200 | 70 | 0 | 200 | accelerating |
| 38 | 180 | 70 | 0 | 200 | |
| 39 | 160 | 70 | 0 | 180 | |
| 40 | 140 | 70 | 0 | 160 | |
| 41 | 120 | 70 | 0 | 140 | |
| 42 | 120 | 70 | 0 | 120 | |
| 43 | 120 | 70 | 0 | 120 | |
| 44 | 120 | 70 | 0 | 120 | |
| 45 | 120 | 70 | 0 | 120 | |
| 46 | 120 | 70 | 0 | 120 | |
| 47 | 120 | 70 | 0 | 120 | constant speed |
| 48 | 120 | 70 | 0 | 120 | |
| 49 | 120 | 70 | 0 | 120 | |
| 50 | 120 | 70 | 0 | 120 | |
| 51 | 120 | 70 | 0 | 120 | |
| 52 | 100 | 70 | 0 | 120 | |
| 53 | 80 | 70 | 0 | 100 | |
| 54 | 60 | 70 | 0 | 80 | |
| 55 | 40 | 70 | 0 | 60 | braking |
| 56 | 20 | 70 | 0 | 40 | |
| 57 | 0 | 70 | 0 | 20 | |
| 58 | -20 | 70 | 0 | 0 | |
| 59 | -40 | 70 | -20 | 0 | regenerative |
| 60 | -40 | 70 | -40 | 0 | |

FIG. 2A

VEHICLE AND POWER UNIT FOR IT

This application is a continuation of prior application Ser. No. 12/956,115 filed Nov. 30, 2010, now abandoned which is a continuation of prior application Ser. No. 11/574,143 filed Nov. 7, 2007, now abandoned which is a national stage application of International Application No. PCT/NL2005/000616 filed Aug. 25, 2005, which claims priority from Dutch Patent Application No. NL 1026910 filed Aug. 25, 2004, all of which are hereby incorporated by reference in their entirety.

BACKGROUND OF THE INVENTION

The invention relates to a vehicle comprising an electromotor for driving the vehicle and a drive system, particularly a so-called hybrid drive system.

Many vehicles driven by electromotors are provided with a device for generating electric power or energy, such as a generator, solar panels or fuel cells. In addition devices are usually present for storing electric power or energy, such as batteries, chargeable batteries, capacitors, or the like. Usually the generator is then operationally connected to the electromotors in order to provide them with electric power, the surplus being supplied to the batteries.

A drawback is that the various demands the individual components make are not optimally dealt with. On the one hand this causes energy loss and the life span of the components may be affected, or as the occasion arises it may cause damage to the components.

For instance US-A1-2004/0065489 describes a fuel cell driven vehicle. As according to said publication a fuel cell is not considered capable of for instance complying with the large changes in power demand, an energy storage in the form of batteries is provided for. The fuel cell thus provides the electromotor with power to drive the vehicle, and for instance a battery temporarily provides the electromotor with additional power in order to cater for the changing power demand. As a result the fuel cell having an actual overcapacity is installed and the battery is disadvantageously burdened.

SUMMARY OF THE INVENTION

It is an object of the invention to at least partially overcome said drawbacks.

To that end the invention provides a vehicle comprising:
at least one electromotor for driving the vehicle;
an actuator for controlling the supply of electric power to the electromotor and
a power system for providing electric power to the electromotor drive of the vehicle, which power system is provided with:
  first energy storage means for storing a quantity of energy and having a power discharge capacity;
  first measuring means for measuring the energy condition of the first energy storage means;
  first power generating means for generating electric power;
  a computer system, operationally connected to the actuator for receiving a power demand, to the first measuring means for receiving a first energy condition value, and to the first power generating means,
wherein the first energy storage means are operationally connected to the electromotor for supplying power thereto, the first power generating means are operationally connected to the first energy storage means for supplying energy thereto, and the computer system controls the power supplied by the first power generating means so that the energy storage means are able to provide the electromotor drive with the power the electric drive needs for driving the vehicle.

By choosing for a mutual connection of the energy sources and power suppliers in the manner according to the invention and a computer system for control, the energy use can be minimised and the advantages of each component can be utilised better.

It will be clear that electric (input) power follows directly from the voltage and the amperage. If the voltage in the vehicle is kept constant, the amperage can be considered a measure for the input power and when the amperage is kept constant the voltage can be considered a measure for input (electric) power. The energy then is the power supplied during a period of time.

In one embodiment of the invention the computer system controls the power supplied by the first power generating means in order for the first energy condition value not to drop below a set first threshold value.

In one embodiment, the computer system is adapted for adjusting the threshold value during the ride.

In an embodiment of the vehicle according to the invention, it further comprises second energy storage means, preferably capacitors, preferably comprising several capacitors each having a capacity of at least 800 F and having an energy storage capacity of at least 2 KJ, operationally connected to the first energy storage means for receiving electric power therefrom or supplying electric power thereto. Said second energy storage means are especially added for supplying high power during a short period of time, for instance for accelerating.

In an embodiment the vehicle further comprises a charging device connected between the first power generating means and the first energy storage means.

In one embodiment of the vehicle it further comprises a control device, connected to the first energy storage means and the charging device.

In one embodiment the vehicle further comprises several first energy storage means, parallel interconnected.

In one embodiment the vehicle comprises several second energy storage means, each second energy storage means being connected to one of the first energy storage means.

In one embodiment each first energy storage means comprises its own charging device and its own control device.

In one embodiment the first energy storage means are adapted for generating direct voltage. In this way no converter is necessary between the energy storage means and the power generating means.

In one embodiment the first power generating means are parallel connected to the first energy storage means.

In one embodiment the first energy storage means or the several energy storage means are each connected via a converter with a solar panel.

In one embodiment of the vehicle the electromotor is a synchronous motor having permanent magnets, provided with a control system for controlling the operation of the electromotor within the electromotor.

In one embodiment of the device the first energy storage means comprise at least one battery.

In a further or alternative embodiment the power generating means comprise a generator preferably provided with a combustion engine.

In a further embodiment the vehicle is further provided with at least one wheel that is directly driven by means of the electromotor, preferably an electromotor in the wheel, particularly a wheel as described in WO-A1-01/54939, of which the description and figures should be considered fully incorporated in this application.

The invention further relates to a vehicle, a power system and method as described in further independent claims and sub claims dependent thereon. Optionally divisional patent applications may relate to the embodiments described therein.

According to another aspect the invention further relates to a vehicle comprising:
- at least one electromotor for driving the vehicle;
- an actuator for controlling the supply of electric power to the electromotor and
- a power system for providing electric power to the electromotor drive of the vehicle, which power system is provided with:
  - a first energy storage for storing a quantity of energy and having an electric power discharge capacity;
  - a first energy meter for measuring an energy condition of the first energy storage;
  - a first power generating unit for generating electric power;
  - a computer system, operationally connected to the actuator for receiving a power demand, to the first energy meter for receiving a first energy condition value therefrom, and connected to the first power generating unit, wherein the first energy storage is operationally connected to the electromotor for supplying power thereto, the first power generating unit is operationally connected to the energy storage for supplying power thereto for supplementing the energy, and the computer system controls the power supplied by the first power generating unit so that the energy storage is able to provide the electromotor drive with sufficient power for driving the vehicle.

The computer system is able to activate the power generating unit as long as the first energy condition value is below a set first threshold value.

Said vehicle may also further be provided with a power meter for measuring a power condition of the first power generating unit, wherein the computer system is furthermore operationally connected to the power meter for receiving a power value therefrom, and the computer system further sets the power supplied by the energy-generating unit to the energy storage adjusted to the power value.

According to another aspect the invention relates to a method for controlling the electric power for an electric drive of a vehicle, wherein a first energy storage supplies electric power to the electric drive, a first power generating unit supplies electric power to the first energy storage, and wherein an energy condition of the first energy storage determines the power to be supplied by the power generating unit.

According to another aspect the invention relates to a power system for supplying electric power to a vehicle having an electric drive, wherein an energy condition of a first energy storage unit determines the electric power to be supplied by a power generating unit to the energy storage unit.

In particular a power discharge capacity of the first energy storage may determine the power discharge capacity of the power system.

More particularly the power discharge capacity of the first energy storage may almost correspond to the power discharge capacity of the power system.

According to another aspect the invention relates to a vehicle comprising an electric drive, preferably comprising at least one electromotor, having a peak input power and a rated input power, an accumulator unit having an energy storage capacity and a power discharge capacity sufficient for supplying the peak input power during a time span necessary for accelerating from a standstill to a cruising speed of the vehicle, and a generator provided with a combustion engine having a rated power discharge approximately corresponding to the rated input power of the electric drive.

In that case the energy storage capacity of the accumulator unit may be sufficient for providing the electric drive of the vehicle with sufficient power for maintaining the cruising speed during a vehicle-specific driving time.

The vehicle-specific driving time may at least be 15 minutes, preferably at least 60 minutes.

According to another aspect the invention relates to power system for providing an electric drive of a vehicle with electric power, comprising an energy storage provided with an energy meter for measuring an energy condition of the energy storage, and a power generating unit provided with a setting unit for setting the electric power to be supplied by the power generating unit, wherein the energy storage supplies electric power to the electric drive, the power generating unit supplies electric power to the energy storage, and the setting unit is operationally connected to the energy meter and sets the electric power to be supplied by the power generating unit to the energy storage on the basis of the energy condition of the energy storage.

The setting unit may in that case be connected to the energy meter via the computer system that controls the setting unit.

According to another aspect the invention relates to a vehicle comprising:
- at least one electromotor for driving the vehicle;
- an actuator for controlling the supply of electric power to the electromotor and
- a power system for providing electric power to the drive of the vehicle, which power system is provided with:
  - first power storage means for storing energy for supplying electric power;
  - first measuring means for measuring the power condition of the first power storage means;
  - first power generating means for generating electric power;
  - second measuring means for measuring the power condition of the first power generating means;
  - a computer system, operationally connected to the actuator for receiving a power demand, to the first measuring means and second measuring means for receiving first and second energy condition values, and to the first power generating means, wherein the first power storage means are operationally connected to the electromotor for supplying power thereto, the first power generating means are operationally connected to the power storage means for supplying power thereto, and the computer system activates the power generating means as long as the first power condition value drops below a predetermined first threshold value.

Optionally the aspects mentioned in this description may be used in combination for further improvement.

SHORT DESCRIPTION OF THE DRAWINGS

The invention is further elucidated on the basis of an exemplary embodiment of electricity for a vehicle according to the invention, in which:

FIG. 2A-2C show a diagram of the energy consumption of a known fuel cell-driven vehicle in comparison to an embodiment of a vehicle according to the invention.

DETAILED DESCRIPTION OF THE DRAWINGS

Figure 1:
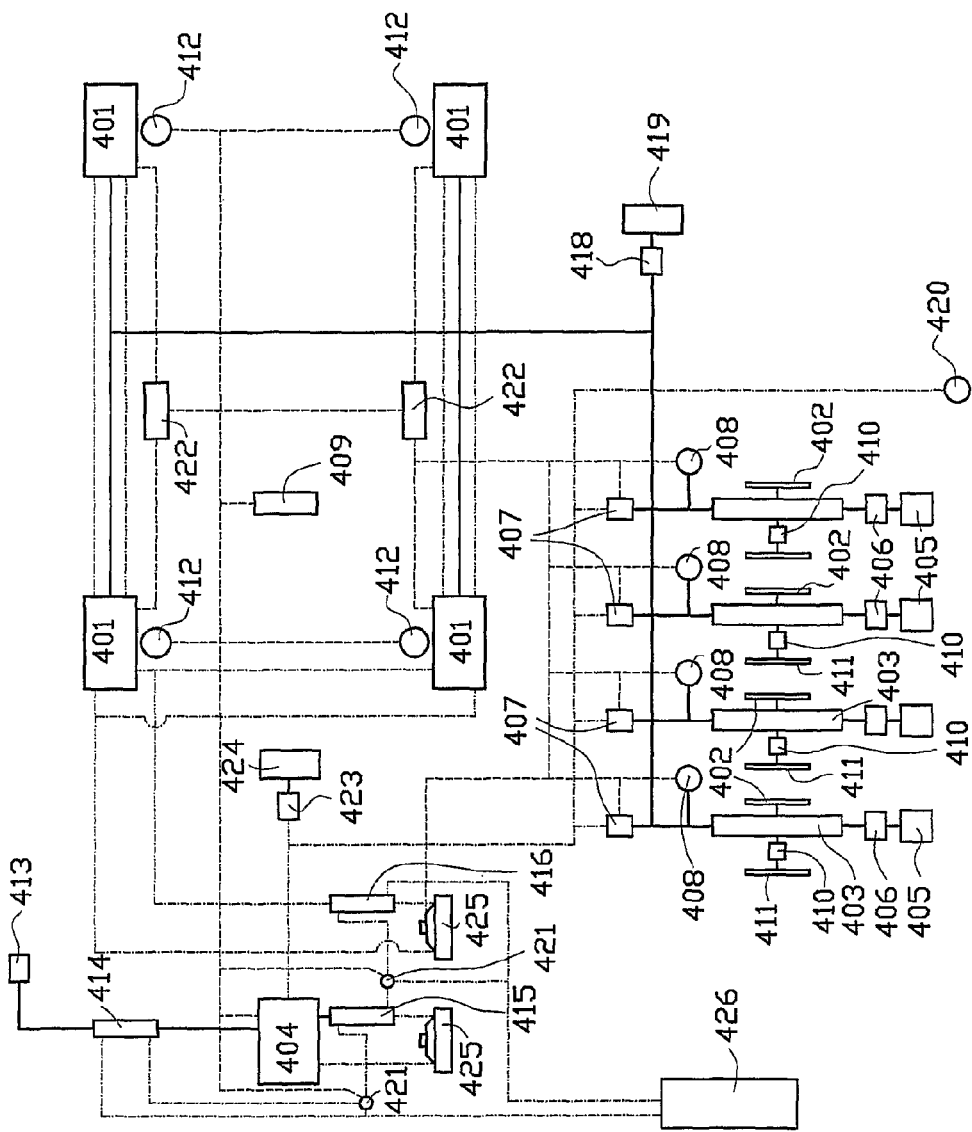
FIG. 1 shows an electricity diagram for a vehicle according to an embodiment of the invention.

FIG. 1 shows a drive system diagram for a drive system according to an embodiment of the invention. In this figure the dot and dash lines are AC-connections, the interrupted lines are data connection lines and the uninterrupted lines are DC-supply lines.

In FIG. 1, the wheels provided with an electric drive are indicated by 401, which wheels are for instance described in International patent application WO-01/54939, and also the wheel struts 412 are described therein connected in a vehicle. In order to supply input to the wheels the vehicle is provided with a computer system 422 and back-up computer system also indicated by 422. In addition input means 409 are provided by means of which a driver of the vehicle is able to enter data and drive the vehicle. The vehicle is provided with very many energy sources namely for the short term, for the medium term and for the long term.

For the short term the vehicle is provided with elements 402 for supplying very high power during a very short time. Such devices may particularly comprise so-called super capacitors, that means capacitors of a very high capacity. Preferably said device comprises capacitors having a capacity of at least about 800 F each. Such capacitors each supply approximately 2.5 V of voltage. According to the invention approximately 160 of such capacitors are used for supplying 400 V. Such capacitors are available up to a capacity of approximately 5000 F. It is of importance that the power stored in the capacitors can be supplied in a short time, usually several seconds, for accelerating the vehicle.

The vehicle as described is furthermore provided with sources for supplying power at the medium term, indicated by 403. Such power sources may for instance be batteries.

In addition a vehicle having an energy system according to the invention may be provided with energy generators for the very long term. This means for instance generators 404, namely conventional generators such a diesel engine, fuel cells or the like, that convert a fuel into electric power. Preferably said generator supplies direct current, so that batteries can be immediately charged.

The vehicle is furthermore provided with an external generator for generating electric power, such as for instance a solar panel. Such a panel is optional.

The vehicle is furthermore provided with a converter for converting the energy from the solar panels into the desired voltage. Said converters are indicated by 406. The vehicle is furthermore provided with battery chargers 407 and a battery control system 408. In addition a reclaim system for the brake energy is provided, in this case parts 410 and 411 (brake energy chopper and brake resisters). Optionally the vehicle moreover comprises generators for reclaiming heat from exhaust gasses and reclaiming heat from the liquid cooling system. Said elements are indicated by 413 (generator reclaiming system for the exhaust gases), 414 (generator for the liquid cooling liquid), 415 (generator for heat exchange with the liquid cooling), 416 (heat exchanger for the cooling liquid of the electrically driven wheels), respectively. For pumping the cooling liquid around for the driven wheels, the vehicle is provided with a liquid pump 417.

The vehicle is furthermore provided with a DC-DC converter for providing power to the sub-systems for the vehicle. Said converter is indicated by reference number 418, and is provided for converting the battery power or the other voltages into voltages that are suitable for systems to drive the vehicle. The vehicle further comprises a so-called auxiliary for battery for vehicle sub systems 419 and a connection 420 for the external power grid.

Furthermore a three-way valve is provided for cooling liquid 421 and a DC-DC-converter for the generator indicated by 423. The vehicle is furthermore provided with various radiators for the cooling of cooling liquid indicated by 425.

What is so special about the electric system of the vehicle specifically described here is the way in which the various power sources are interconnected. For instance the so-called super capacitors 402 that are capable of supplying a very high power for a very short time, for instance for accelerating the vehicle, are connected to batteries. Via a battery control system the batteries are directly connected to the wheels and wheel struts in order to supply power to them. The generator 404 (or fuel cells for instance), is not directly connected to the wheels and wheel struts here, that means not directly to the power consumers, but is connected to the batteries via the chargers 407. In this way the vehicle can be divided into power consumers, that means the wheel struts, the internal vehicle systems and the wheel struts, and various sources of electric power, that means the very short term sources, the medium term sources and the long term sources.

In the embodiment according to the invention the medium term sources, that means for instance the batteries, are directly connected to the power consumers. The other power sources are indirectly connected to the wheels via the energy sources for the medium term, that means for instance the batteries. For instance there are solar panels 405 which by means of converters 406 are connected to the batteries, so-called super capacitors for supplying high power during a very short period of time, indicated by 402 and connected to the batteries, and in this way the brake power energy reclaiming systems 411 are also connected to the batteries via converters 410. Also the generator or fuel cell or the like 404 is connected to the batteries via chargers 407. Each battery is furthermore provided with a battery control system 408 that monitors the power and the desired power of the batteries and at the right moment adds the correct additional power source or gives a warning when one of the energy sources does not have enough power.

Figure 2B:
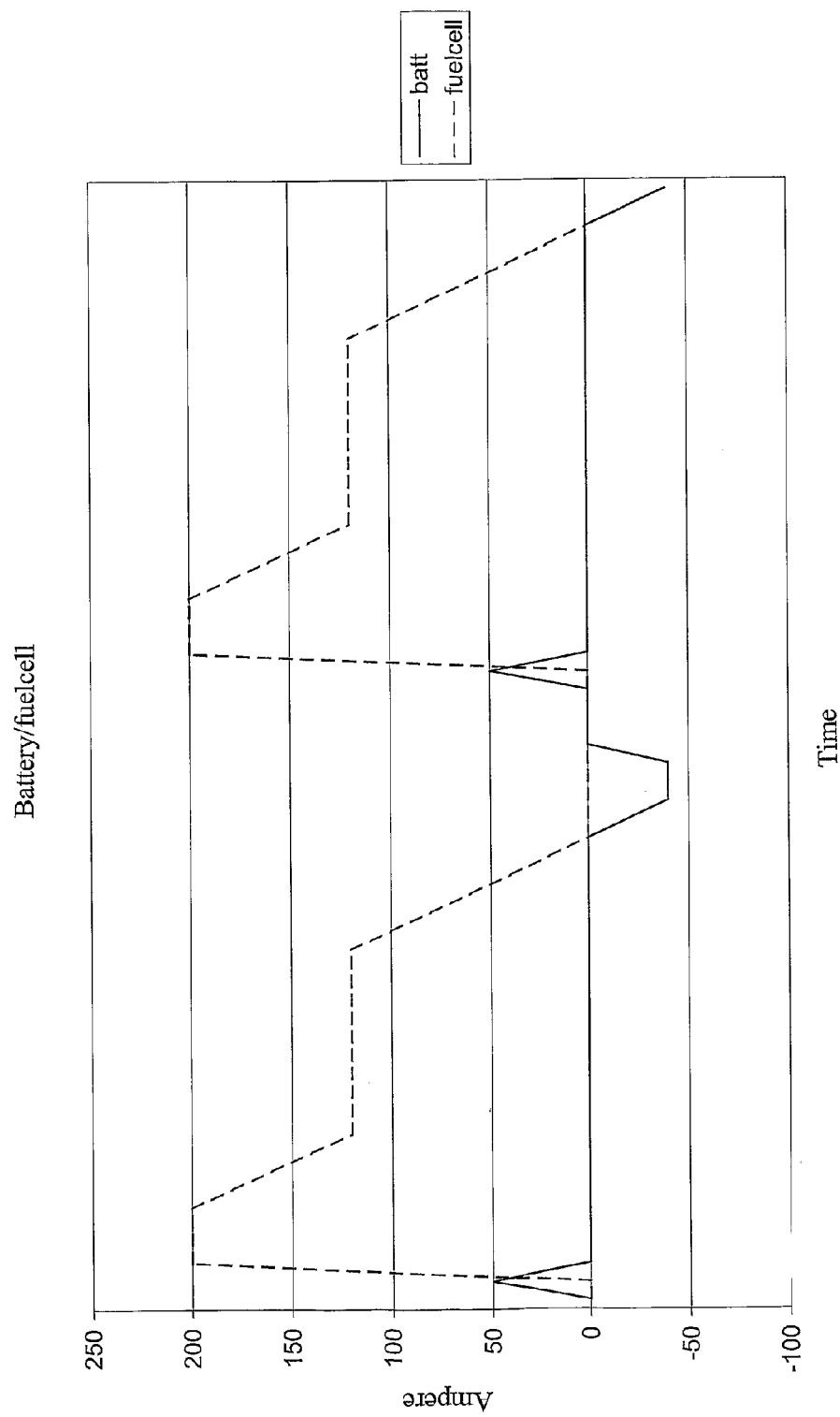
Figure 2C:
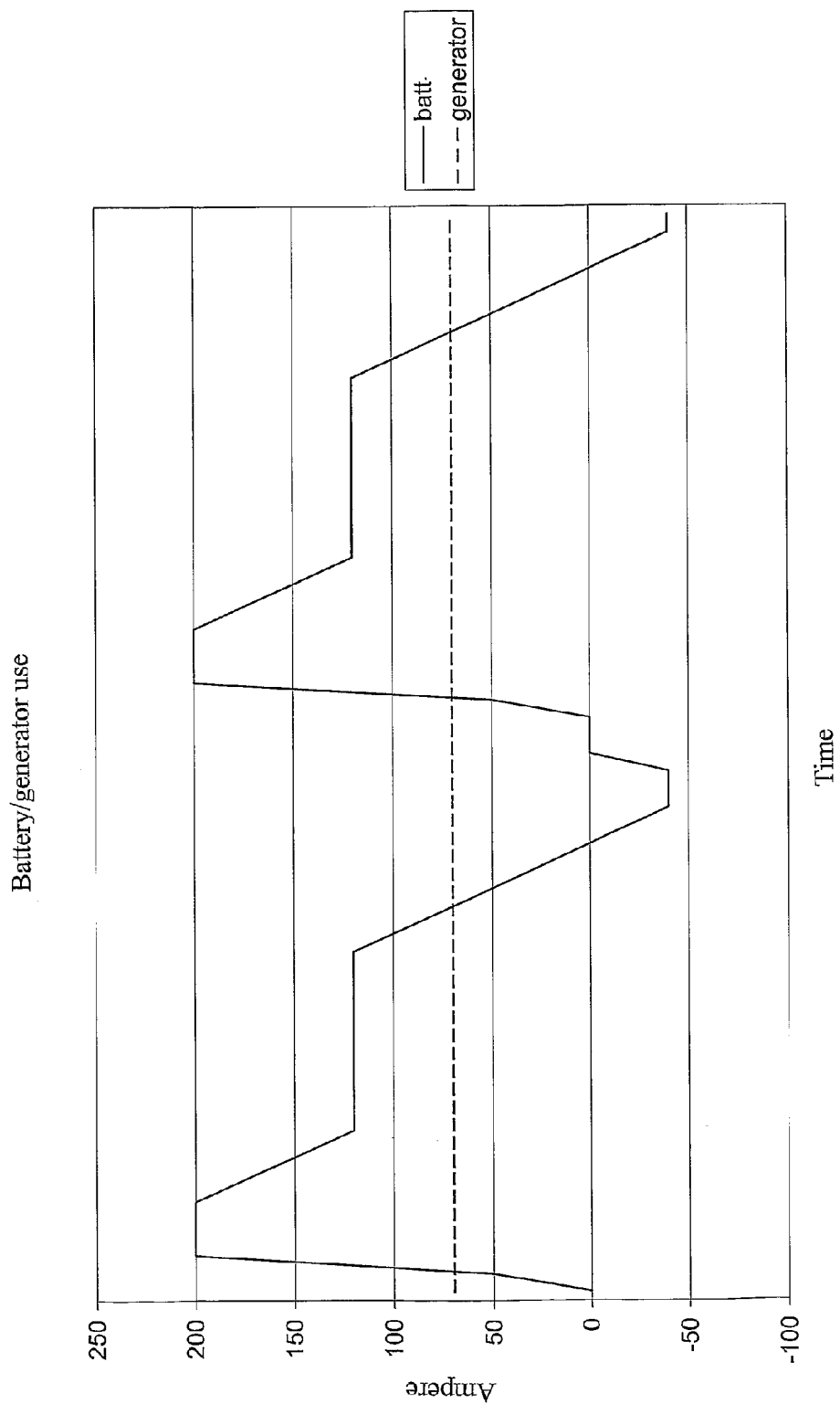

FIGS. 2A-2C show an energy consumption diagram of a known fuel cell-driven vehicle in comparison with an embodiment of a vehicle according to the invention. FIG. 2A shows a table with a time path with random units 1-60. Column 1 shows the amperage that a battery in a vehicle according to the invention should for instance supply to an electromotor in order to drive it. Column 2 shows the amperage that the generator supplies during the entire path. Said amperage level is based on historical information regarding the driving behaviour of a vehicle for instance obtained via measurements. In that way it can be determined what a usual driving time is, and the related overall electric power to be supplied by a generator.

Column 3 shows the power to be supplied by a battery for the same drive path in case of a fuel cell-driven vehicle, such as for instance described in the above-mentioned US-A1-2004/0065489. Column 4 of the table gives an example of an amperage to be supplied by the fuel cell. The column on the far right shows in shades the various driving situations, consecutively: accelerating, constant speed, braking, standing still, accelerating, constant speed and braking.

FIG. 2B shows a graph of the amperage supplied by the battery and the fuel cell, respectively, that were shown in the table of FIG. 2A. It can clearly be seen that the battery is activated when the power demand suddenly rises, and is charged during regenerative braking, wherein an electromotor connected to the wheels of the vehicle functions as a dynamo and generates energy. In this configuration only a small installed power worth of batteries needs to be installed. However a strongly overdimensioned fuel cell needs to be used.

FIG. 2C shows the same driving path as FIG. 2C, in this case, however, for a vehicle according to the invention. In this case the battery supplies the actual power to one or more electromotor(s), and the fluctuations in the power demand can be largely compensated. As explained before regarding FIG. 1 ultra fast power suppliers such as "super capacitors" or even "ultra capacitors" may ensure a short energy boost.

The generator in this case supplies a constant power. When the battery, which controls the actual power demand to the generator, is fully charged it will be able to entirely switch off the generator. It is even possible that the power condition of the battery (set) controls a power modulation of the generator. Please note that in this case as well the amperage during braking is below zero as use is made here of regenerative braking, that means that when slowing down a vehicle a driving electromotor functions as dynamo.

It will be clear that the above description is included to illustrate the operation of preferred embodiments, and not to limit the scope of the invention. Starting from the above explanation many variations that fall within the spirit and scope of the present invention will be evident to an expert.

The invention claimed is:

1. A vehicle, comprising
wheels;
at least one electric drive configured for driving at least one of the wheels;
at least one battery connected to the electric drive and adapted to supply electric current to the drive for driving the at least one wheel;
at least one electric power generator connected to the at least one battery for charging of the at least one battery;
capacitors adapted to supply very high electric power during a very short time, said capacitors being connected to the at least one battery for supplying electric power and not being directly connected to the at least one electric drive; and
a battery control system provided for each battery, the battery control system being configured for monitoring the electric power and the desired electric power of the respective at least one battery for driving of the vehicle, and to add additional electric power from the electric power generator and/or from the capacitors to the at least one battery or give a warning when there is not enough electric power available in the at least one battery,
wherein there is no controller between the at least one battery and the at least one electric drive for controlling connection or disconnection of the at least one battery to or from the electric drive so that the at least one battery is continuously connected to the at least one electric drive, and the at least one electric power generator is connected to the at least one battery via a charger and is not directly connected to the at least one electric drive.

2. The vehicle of claim 1, wherein the at least one electric power generator converts fuel to electric power.

3. The vehicle of claim 2, wherein the at least one electric power generator comprises an internal combustion engine or a fuel cell.

4. The vehicle of claim 1, wherein the capacitors each have a capacity of at least 800 F.

5. The vehicle of claim 1, wherein the vehicle is provided with a computer system and a back up computer system configured to supply input to the wheels.

6. The vehicle of claim 5, wherein an input device is adapted to permit a driver of the vehicle to enter data and drive the vehicle.

7. The vehicle of claim 1, wherein each capacitor is configured to supply approximately 2.5 V.

8. The vehicle of claim 7, wherein approximately 160 of said capacitors are used to supply 400 V.

9. A vehicle, comprising:
four wheels;
four electric drives, each configured for one of the respective four wheels;
at least one battery connected to the electric drive and adapted to supply electric current to the drive for driving the at least one wheel;
at least one electric power generator connected to the at least one battery for charging of the at least one battery;
capacitors adapted to supply very high electric power during a very short time, said capacitors being connected to the at least one battery for supplying electric power and not being directly connected to the four drives; and
a battery control system provided for each battery, the battery control system being configured for monitoring the electric power and the desired electric power of the respective battery for driving of the vehicle, and to add additional electric power from the at least one electric power generator and/or from the capacitors to the at least one battery or give a warning when there is not enough electric power available in the at least one battery,
wherein there is no controller between the battery and the at least one electric drive for controlling connection or disconnection of the at least one battery to or from the electric drive so that the at least one battery is continuously connected to the at least one electric drive, and the at least one electric power generator is connected to the at least one battery via a charger and is not directly connected to the at least one electric drive.

10. The vehicle of claim 9, wherein the at least one electric power generator converts fuel to electric power.

11. The vehicle of claim 9, wherein the at least one electric power generator comprises an internal combustion engine or a fuel cell.

12. The vehicle of claim 9, wherein the capacitors each have a capacity of at least 800 F.

13. The vehicle of claim 9, wherein the vehicle is provided with a computer system and a back up computer system configured to supply input to the wheels.

14. The vehicle of claim 13, wherein an input device is adapted to permit a driver of the vehicle to enter data and drive the vehicle.

15. The vehicle of claim 9, wherein each capacitor is configured to supply approximately 2.5 V.

16. The vehicle of claim 15, wherein approximately 160 of said capacitors are used to supply 400 V.

* * * * *